United States Patent Office

CLEMENS FLEMMING FLACH, OF CALL, PRUSSIA.

*Letters Patent No. 63,492, dated April 2, 1867.*

EXTRACTING SILVER FROM ARGENTIFEROUS LEAD ORE.

The Schedule referred to in these Letters Patent and making part of the same.

Be it known that I, CLEMENS FLEMMING FLACH, of the city of Call, Rhenish province, in the Kingdom of Prussia, have invented improvements in the Process of Extracting the Silver, &c., from Argentiferous Lead Ore; and I do hereby declare that the following is a full, clear, and exact description of the invention.

The nature of my invention consists of treating argentiferous lead ore in such a manner so as to entirely extract the silver contained therein, and to simultaneously reproduce the lead in a pure state, freed from all its alloys of zinc, iron, copper, antimony, and bismuth.

I reach my purpose by a threefold process, viz: A, the extraction of the silver from its lead ore through alloying the latter with zinc; B, the purification of the lead remaining thereafter; C, the refinement, viz, the separation of the silver gained sub A from its alloys of zinc and lead.

The employment of zinc in treating argentiferous lead or (Parks having been the first in introducing the same) is nothing new, but had to be abandoned for its lack of economy, the lead, besides, obstinately retaining its alloy of zinc, while my blast-furnace process, as described hereafter, changes the above theory into both a practical and advantageous reality. Similar deficiencies of prior methods, if compared to my invention, offer the mode of separating the metals forming the alloy of silver, gained in process A, through a treatment (distilling) with muriatic or sulphuric acids; also the mode of removing the zinc from the zinc lead by passing the latter through the refining furnace and boiling the same with green wood afterwards.

My blast-furnace process will entirely fulfill what all former systems and modes have been able to fulfill but partly, and will, in an easy, economical, and thorough manner, extract the entire relative amount of silver, and retain in a pure state the balance of lead forming parts of the said argentiferous ore, showing a considerable gain above that reached by Pattinson's and other modes of extraction heretofore in use. My process also requires scarcely more or other utensils and apparatuses, as these will be found existing already in every lead-works.

The importance, novelty, and value of my invention have been recognized already by its entirely successful introduction in several European countries, and by the grants of patent for the kingdom of Prussia, &c., &c., of which I beg to be allowed to furnish the required copy at my earliest opportunity.

To enable those skilled in the art to understand and use my invention, I shall describe its operation, dividing the same into three sections, corresponding with those as marked above by the letters A B C.

I. The lead ore being molten in a kettle, which is provided at its bottom with a proper tube and stopcock, I add and stir in well a certain quantity of zinc, the same having to be used in the three operations described hereafter to its respective proportions, being one and one-twelfth per cent. for ore containing upwards to one thousand grains of silver to the ton; one and a quarter per cent. for ore containing upwards to fifteen hundred grains of silver to the ton; one and a half per cent. for ore containing upwards to three thousand grains of silver to the ton. The molten lead alloyed, as stated above, is now allowed to rest for two or three hours, when the alloy of lead, zinc, and silver (which I will call on further occasion the "silver alloy") will be found floating on the surface, and has to be taken off. I repeat the above operation two times more, after which the lead remaining (which I shall call "zinc lead") will have given up all of the silver, only about five grains to the ton remaining with the lead. While the employment of large proportions of zinc would never accomplish the purpose to be reached in one single operation, and consequently would result in a needless wasting of material, a comparatively small quantity of zinc, if disposed of in three subsequent operations, as described above, will accomplish the object in an easy and rational manner. The "silver alloy," gained as before mentioned, is now put into another kettle and thoroughly heated, so as to cause the surplus of zinc lead to melt and ooze out, thus raising the above argentiferous alloy remaining thereafter from four to eight per cent. of its intrinsic content of silver. The lead gained by this operation will yet contain about three hundred grains of silver in the ton, which it however will be forced to deliver down to the above lowest margin of five grains by a single treatment with one-quarter per cent. of zinc.

II. Proceeding to the purification or refinement of the zinc lead left after the operations as described under I, I melt the same down in a blast furnace, adding a weak, neutral, or basic silicate of iron; dross, emery, marl, lime, or argilliferous dross will easily and completely scorify the zinc. In order to prevent the least possible loss of lead, the wind pressure should not overreach eighteen centimetres of a corresponding water pressure This zinc lead, treated as above, is now remolten in a kettle and boiled with green wood, by which process the smallest admixtures of iron, copper, and zinc will be absorbed or neutralized, thus leaving the lead entirely pure. The antimony and bismuth having gone over into the silver alloy already, there may, however, some antimony have remained with the lead, (this being the case if the ore had contained antimony in a higher proportion than one-tenth per cent.) Such surplus is now removed from the lead by either mixing the same during its melting-down process with some kitchen salt or by heating the lead in an oven, thus evaporating the antimony.

III. The silver alloy gained as described under I has to be treated, in a small blast furnace, similar to the zinc-lead purifying or refining process, as described under II, viz, has to be molten down with a weak basic siliciferous dross, while the remaining lead may be submitted to cupellation, so as to leave behind the silver yet contained in it. During the melting-down process there is no loss of silver to be feared. The oxide of zinc escaping meanwhile may be recovered through its interception by means of a chamber or its passage through water.

Having thus described the operation, what I claim as being my invention, and desire to secure by Letters Patent, is—

The improvement in extracting the silver and treatment of the lead contained in argentiferous lead ore by the means of a blast-furnace process, in a manner substantially as described above.

CLEMENS FLEMMING FLACH.

Witnesses:
  HM. YAGER,
  C. COELEN.